United States Patent
Hogan

(10) Patent No.: US 12,389,881 B2
(45) Date of Patent: Aug. 19, 2025

(54) PORTABLE PET GROOMING DEVICE

(71) Applicant: Sean M Hogan, Mooresville, NC (US)

(72) Inventor: Sean M Hogan, Mooresville, NC (US)

(*) Notice: Subject to any disclaimer, the term of this patent is extended or adjusted under 35 U.S.C. 154(b) by 0 days.

(21) Appl. No.: 18/467,073

(22) Filed: Sep. 14, 2023

(65) Prior Publication Data
US 2025/0089677 A1 Mar. 20, 2025

(51) Int. Cl.
*A01K 13/00* (2006.01)
*A46B 5/00* (2006.01)
*A46B 15/00* (2006.01)
*A01K 27/00* (2006.01)

(52) U.S. Cl.
CPC .......... *A01K 13/002* (2013.01); *A01K 27/003* (2013.01)

(58) Field of Classification Search
CPC ..... A01K 13/002; A01K 27/008; A47L 13/10; A47L 13/12; A46B 5/0016; A46B 7/023; A46B 15/00; A46B 15/0061; A46B 9/06; A46B 2200/10; A46B 2200/1093; A46B 15/0091; A46B 2200/104; A45D 44/18
See application file for complete search history.

(56) References Cited

U.S. PATENT DOCUMENTS

| | | | | |
|---|---|---|---|---|
| 230,178 A | * | 7/1880 | Maurey-Deschamps | A45C 11/24 132/121 |
| 1,055,088 A | * | 3/1913 | Scheuer | A46B 7/023 15/106 |
| 1,101,065 A | * | 6/1914 | Davis | 132/121 |
| 2,851,713 A | * | 9/1958 | Tupper | A47K 5/03 D4/130 |
| 12,150,542 B1 | * | 11/2024 | Campbell | A46B 15/0061 |
| 2007/0180638 A1 | * | 8/2007 | McKay | A46B 17/04 15/22.1 |
| 2010/0006576 A1 | * | 1/2010 | Berry | A01K 27/006 220/500 |
| 2024/0197062 A1 | * | 6/2024 | Roth | |
| 2024/0407541 A1 | * | 12/2024 | Sporn | A46B 15/0095 |

FOREIGN PATENT DOCUMENTS

| | | | |
|---|---|---|---|
| DE | 1117539 B | * 3/1960 | |
| GB | 488007 A | * 12/1937 | |
| GB | 2180443 A | * 4/1987 | A46B 15/00 |

* cited by examiner

*Primary Examiner* — Kristen C Hayes
(74) *Attorney, Agent, or Firm* — Kyle A. Fletcher, Esq.

(57) ABSTRACT

A portable pet hair brush device for grooming pets while being walked by mounting the brush device onto the pet leash or use independently by removing the brush device from the pet leash. The portable pet grooming device for brushing hair of pets comprises a base, wherein the base further comprises a plurality of containers including a top cover and a bottom case and a latch in the center of the top cover and the bottom case to lock the device; at least one pad; and multiple bristles, wherein the bristles are mounted on one side of the pad and the other side of the pad is then attached on the exterior of the top and bottom of the base, respectively.

4 Claims, 6 Drawing Sheets

PORTABLE PET GROOMING DEVICE

FIELD OF THE INVENTION

The present invention relates to a portable pet hair brush attached to a pet's leash. The invention, more particularly, relates to a pet hair brush which when attached onto a pet's leash combines the task of walking the pet and brushing its hair during their walk.

BACKGROUND OF THE INVENTION

Pet grooming is a long and expensive process especially if the pet has a long and difficult coat of hairs. Their hair becomes strained with food or dirt from the garden or the park and if not brushed regularly can create tangles and knots which makes the grooming process more time consuming. In addition, there are pets who resist getting their hair brushed. It is important that their hair is brushed regularly to maintain a healthy and clean coat. However, many a times, the owners forget or avoid regularly brushing their pet's hair as it not only requires care and takes time but also makes a mess at the house which needs further clean-up.

Therefore, a need remains for a device that is portable, smart, easy to use, saves time and avoids making a mess. Further, there is a need for a device that can not only groom pets with difficult coats but also is appealable to the pets so that they do not resist the brushing of their hairs.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses a portable pet hair brush device for grooming pets while being walked by mounting the said brush device onto the leash or use independently by removing the brush device from the leash.

It is an object of this invention to provide a portable, self-cleaning pet grooming device in the shape of a bone with bristles on opposite sides of a base and a storage space formed within the base. The grooming device is preferably mounted on a pet leash resulting in grooming of pets/animals while being walked.

It is another object of this invention to provide a hair brush comprising a storage base, at least one pad, and bristles, wherein the bristles are mounted on one side of the pad and the other side of the pad is then attached on the exterior of the top and bottom of the base respectively. The bristles provided may include a rough brush with conic bristles and rounded tip mounted on one exterior side of the storage base whereas a soft brush with traditional fine bristles mounted on the opposite exterior side of the storage base.

It is an additional object of the invention to provide a storage base comprising of a plurality of containers including a top cover and a bottom case, and a latch in the center of the top cover and the bottom case to lock the storage base when the top cover and the bottom case come in full contact with each other. The plurality of containers clamp together onto the pet leash to remain stationary while in movement of either walking or while brushing the pet. The top cover and the bottom case of the base create an internal cavity in which contents can be stored. The contents may include, but not limited to, waste bags, treats for pets, or keys. The inner cavity may have bristles to help the device adhere to multiple pet leash types (i.e. flat strap or rounded ropes). Moreover, the plurality of containers has space on the outside surface around the pads to be used as a handle or provide grip while brushing the hair manually. The pet owner will groom their pet by holding the leash protruding from both ends of the brush device or by removing the brush device from the leash and utilizing the available handles or grips on each end of the device.

It is yet another object of the invention to provide an illumination coating on either the brush or the base or both thereby making the pet and its owner or walker visible to the vehicles & people on the road during night walking or if the pet is lost.

It is still another object of this invention to provide a lengthwise brush made of rubber or silicone with pet safe rounded tip bristles of two different sizes on the exterior of the top and bottom surface of the base.

In a preferred embodiment, a portable pet grooming device for brushing hair of pets comprises a base, wherein the base further comprises a plurality of containers including a top cover and a bottom case, and a latch in the center of the top cover and the bottom case to lock the base when the top cover and the bottom case come in full contact with each other, wherein a storage space is formed within the base by the top cover and the bottom case of the base, wherein the storage space includes grooves for holding a pet leash and an internal cavity for storing contents; at least one brush pad; multiple bristles mounted on one side of a brush pad forming a lengthwise brush, wherein the other side of the brush pad is affixed on the exterior of the top cover and the bottom case of the base, respectively; wherein the grooming device is preferably mounted on a pet leash resulting in grooming of pets/animals while being walked or the grooming device is used independently by removing the grooming device from the leash.

These together with other objects and advantages which will become subsequently apparent reside in the details of the invention as more fully described and claimed, reference being had to the accompanying drawings forming a part thereof, wherein like numerals refer to like parts throughout.

BRIEF DESCRIPTION OF THE DRAWINGS

The novel features of the invention, as well as the invention itself, both as to its structure and its operation will be best understood from the accompanying drawings, taken in conjunction with the accompanying description, in which similar reference characters refer to similar parts, and in which.

DETAILED DESCRIPTION OF THE INVENTION

Figure 1:
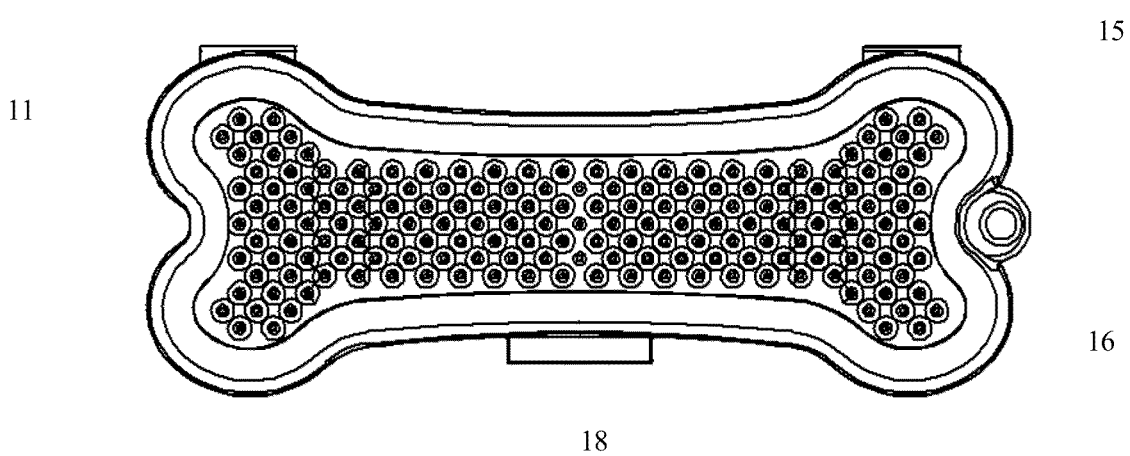
FIG. 1: shows a top view of the pet grooming device of the present invention.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skill in the art without departing from the scope of the invention.

The present invention combines the function of a pet brush that can travel with the pet via its own leash as compared to a normal pet brush that would have to be carried during walks and not desired in any pocket. Moreover, if the pet gets dirty while playing in the park, the owner or the pet walker can immediately brush the hair or coat of the pet with the pet hair brush of the present invention. The pet grooming device of the present invention can be either attached onto a leash or used independently as a hair brush or as a retrievable toy for the pets.

Figure 2:
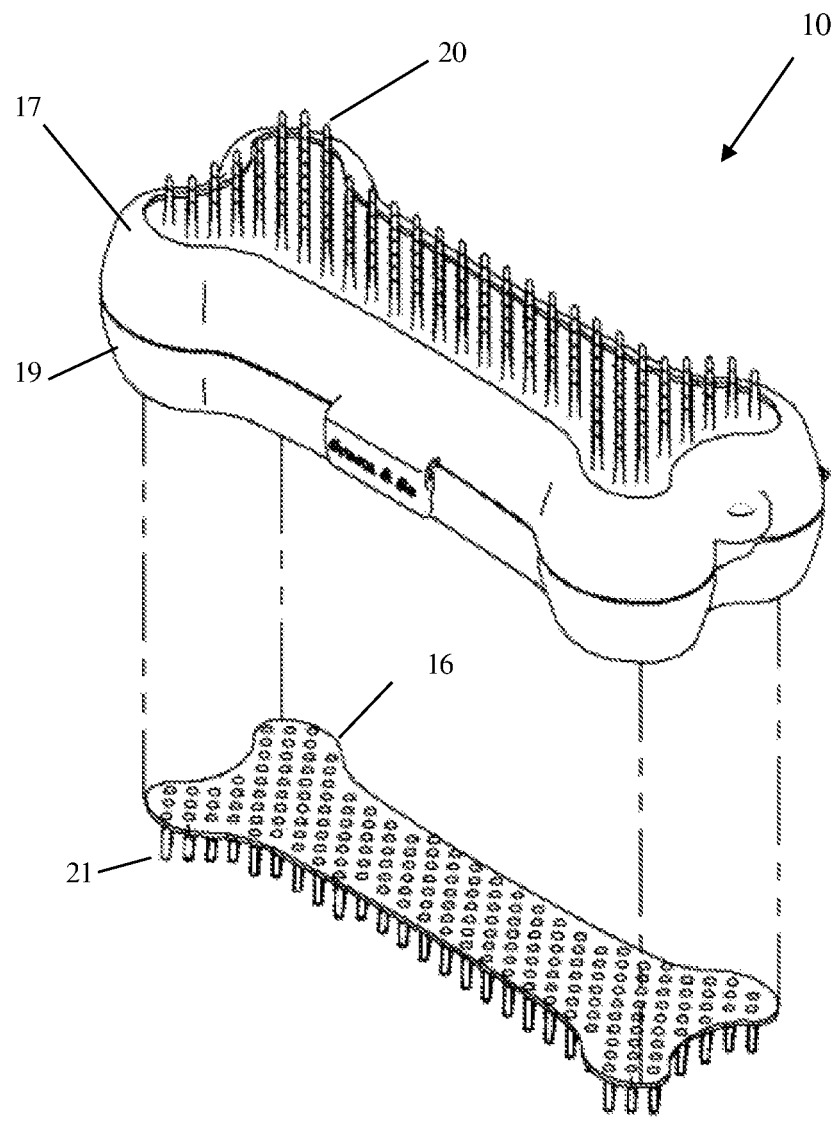
FIG. 2: shows a view of the pet grooming device with a detached bottom brush pad.
Figure 3A:
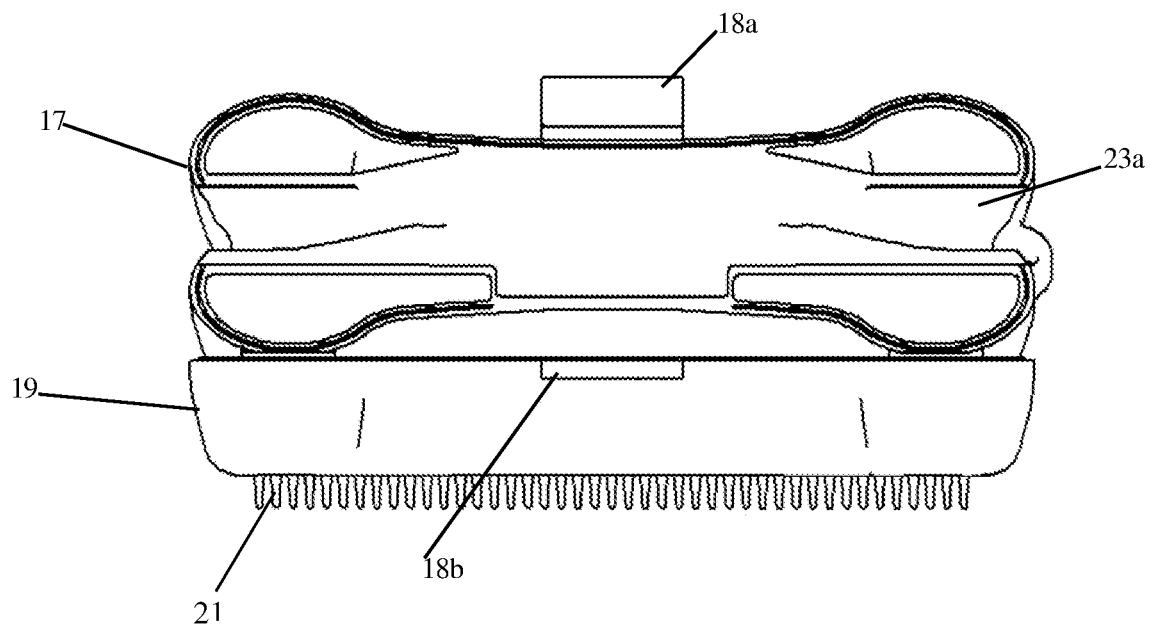
FIG. 3a: shows a front and open view of the pet grooming device of the present invention.
Figure 3B:
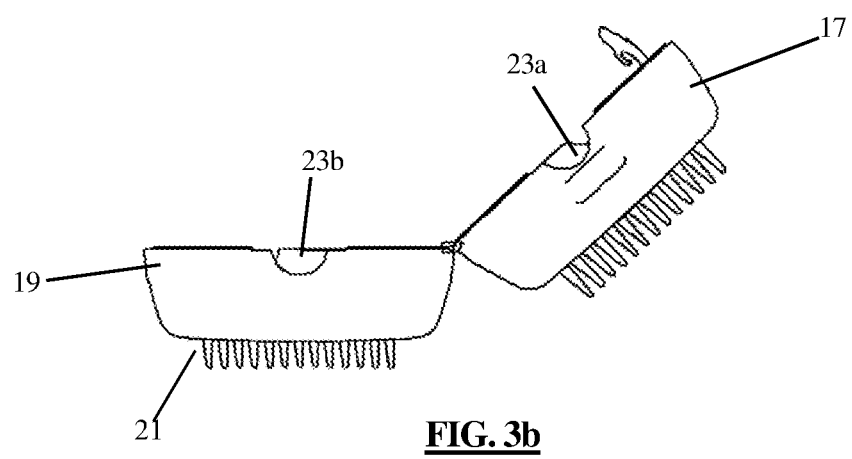
FIG. 3b: shows a side open view of the pet grooming device of the present invention.
Figure 4A:
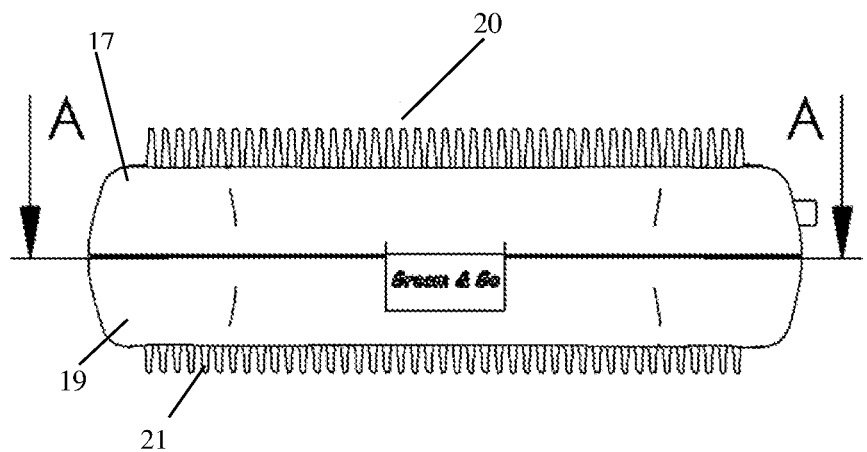
FIG. 4a: shows a front & closed view of the pet grooming device of the present invention.
Figure 4B:
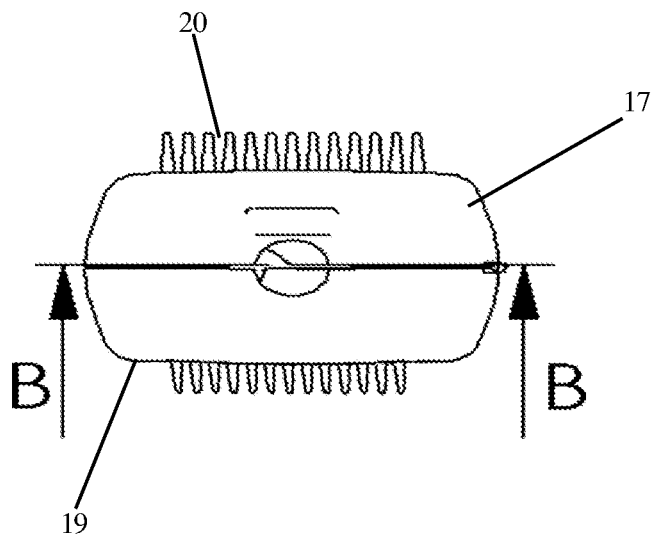
FIG. 4b: shows a side closed view of the pet grooming device of the present invention.

As shown in FIGS. 1-6, the pet grooming device 10 of the present invention comprises at least one hair brush pad 16 and a storage base or box 11. The storage base 11 further comprises a plurality of containers including a top cover 17 and a bottom case 19, and a latch 18 in the center of the top cover 17 and the bottom case 19 to lock the storage base 11 when the top cover 17 and the bottom case 19 come in full contact with each other. The pet grooming device 10 of the present invention further comprises multiple bristles for brushing pet hair. As seen in FIG. 1, one side of the brush pad 16 further includes circular holes 15 in which multiple bristles are mounted. The other side of the brush pad 16 is then attached on the outside of the top cover 17 and bottom case 19 of the storage base 11 respectively. The brush pad 16 is attached onto the storage base 11 via adhesive like glue applied to the brush pad or the storage base or both. The bristles provided may include a rough brush with conic bristles and rounded tip 21 on one side of the storage base 11 whereas a soft brush with traditional longer, fine bristles 20 on the opposite side of the storage base 11. As shown in FIG. 2, the longer, soft & smooth bristles 20 are attached on the top cover 17 whereas shorter, hard tip bristles 21 are attached on the exterior of the bottom case 19.

Figure 5:
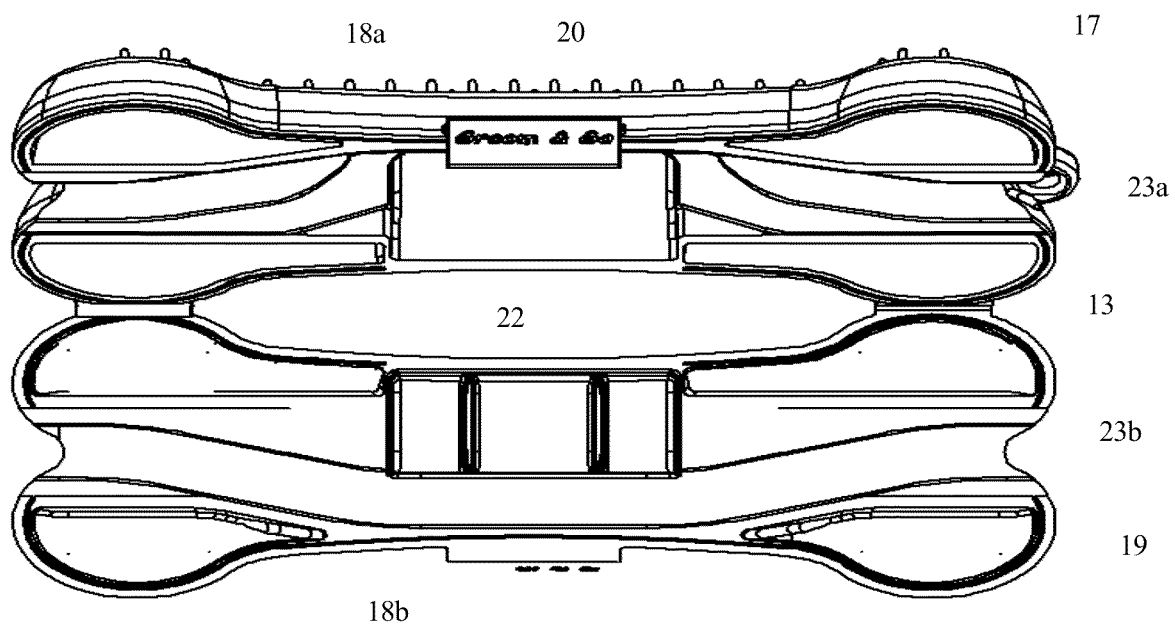
FIG. 5: depicts a top open view of the pet grooming device of the present invention.
Figure 6:
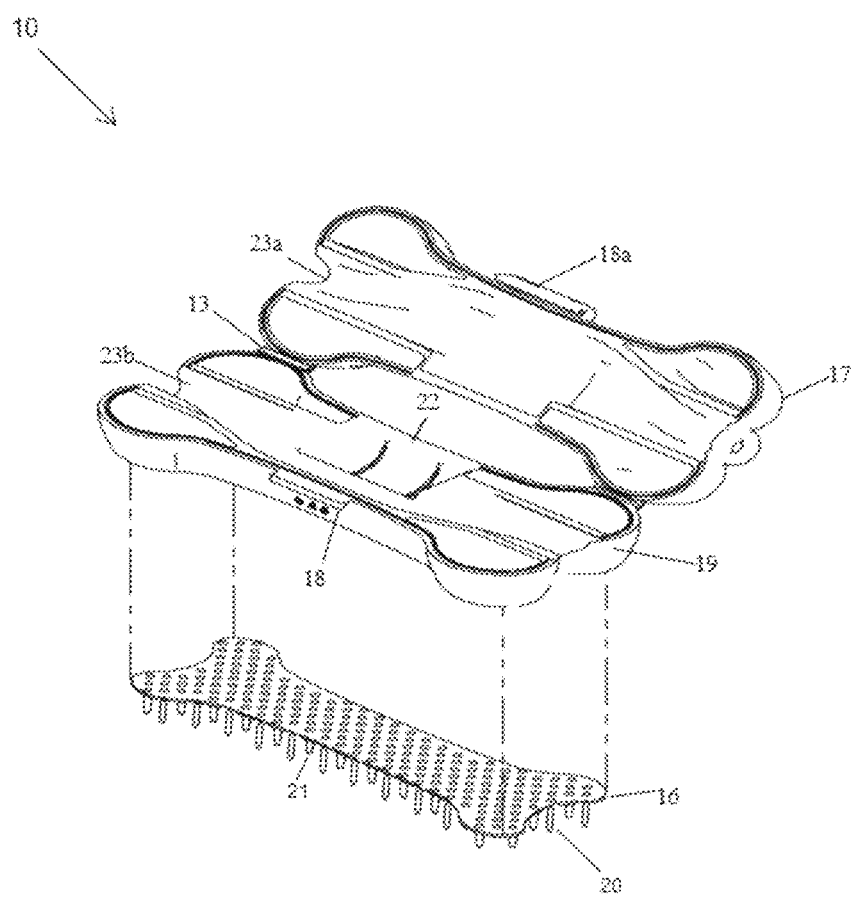
FIG. 6: shows an open view with detached bottom brush pad of the pet grooming device of the present invention.

The storage base further includes a latch 18 wherein the latch cover 18a is in the center of the top cover 17 and a latch slot 18b is in the bottom case 19 to receive the latch cover 18a thereby locking the storage base 11. As shown in FIGS. 5 & 6, the storage base 11 of the device 10 further consists of internal cavities or spaces 22 to store or hold various contents. The top cover 17 and the bottom case 19 of the base create an internal cavity 22 in which contents can be stored. The contents may include waste bags, treats for the pets, wipes or tissues. The waste bags can be dispensed without a need to open the storage base 11 of the pet grooming device 10.

The plurality of containers 17 & 19 clamp together over the pet leash to remain stationary while in movement of either walking or while brushing the pet. As shown in FIGS. 5 & 6, the storage base 11 of the pet hair brush device 10 houses a groove or channel 23a in the top cover 17 and 23b in the bottom case 19 for holding onto the pet leash. The groove or channels 23a & 23b may have additional bristles or pins to produce a strong hold onto the end-users leash. The groove or channels 23a & 23b can hold all sizes and types of leashes like flat leads, rubber leads, slip leads or harness. The leash is placed in the grooves and the top cover and bottom case is closed thereby attaching onto the leash. The pet grooming device 10 of the present invention can be placed or attached at any point on the leash. For e.g. it may be near the neck of the pet or towards the end of the leash or in the middle of the leash. The location can be decided as per the comfort of the owner walking the pet or the body part where the owner would like to brush pet's hairs. The device can be easily moved throughout the leash without opening the containers. The pet owner will groom their pet by holding the leash protruding from both ends of the storage box or by removing the brush from the leash and utilizing the available handles or grips on each end of the box surface.

The storage base 11 is preferably made up of one single molded piece wherein both halves, the top cover 17 and the bottom case 19, are joined together with a flexible hinge 13 as can be seen in FIGS. 5 & 6. The storage base 11 can be made up of hard plastic, rubber, or silicone. It is preferably made of rubber as it may bend to the contour of the pet's body thereby making brushing easy and painless. In one embodiment, the storage base 11 is made of thermoplastic polymer like polypropylene to provide durability, flexibility and heat resistance to the device. The storage base may be made up of clear and transparent plastic which will provide a clear view of the contents within the box. In one embodiment, this pet grooming device of the present invention could serve as a throwable retrieving toy when made up of hard rubber.

The pet hair brush mounted on a storage base may come in different shapes and sizes. The shapes of the storage base and the brush pad may include, but not limited to, rectangle, round, or a bone shape. It is preferably made in a dog bone shape thereby making it appealable to the pets especially dogs. Moreover, the grooming device of the present invention can be an attractive chew toy as well due to its various shapes.

In one embodiment, the grooming device of the present invention may include a safety feature due to the hair brush's location, especially when attached to a pet leash. The device can be provided with high visibility or illumination coatings thereby making the pet and its owner visible to vehicles during dark night walks. The said illumination coating may also help in locating the pet if it wanders and gets lost.

The grooming device of the present invention makes it convenient for users to brush their pets on the go. It may further appeal to the equestrians and horse owner communities.

While many of the fundamental characteristics and features of the pet grooming device have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit and scope of the invention. Consequently, all such modifications and variations are included within the scope of the invention as defined herein.

The invention claimed is:

1. A portable pet grooming device for brushing hair of pets comprising:
    a base, wherein the base further comprises a plurality of containers including a top cover and a bottom case, and a latch in the center of the top cover and the bottom case to lock the base when the top cover and the bottom case come in full contact with each other, wherein a storage space is formed within the base by the top cover and the bottom case of the base, wherein the storage space includes grooves inside of the top cover and the bottom case, respectively, for holding a pet leash and an internal cavity for storing contents; wherein the plurality of containers forming the storage base clamp together over the pet leash to remain stationary while in movement of either walking or while brushing the pet;
    a first brush pad and a second brush pad;
    wherein the first brush pad is affixed on the exterior of the top cover;
    wherein the second brush pad is affixed on the exterior of the bottom case;
    multiple bristles mounted on one side of the first brush pad forming a lengthwise brush, wherein the multiple bristles are of different sizes, wherein the first brush pad has conic bristles and rounded tip whereas the second brush pad has fine bristles;
    wherein the grooming device is preferably mounted on a pet leash resulting in grooming of pets/animals while being walked or the grooming device is used independently by removing the grooming device from the leash.

2. The portable pet grooming device of claim 1, wherein contents stored in the inner cavity includes waste bags, treats for pets, or keys.

3. The portable pet grooming device of claim 1, wherein the inner cavity grooves have additional bristles or pins to secure the device adhere to multiple pet leash types like flat strap or rounded ropes of all sizes and types of leashes.

4. The portable pet grooming device of claim 1, wherein an illumination coating is provided on the brush pad or the storage base or both thereby making it visible to vehicles on the road or during night walks.

* * * * *